US007792510B2

(12) United States Patent
Pestryakov et al.

(10) Patent No.: US 7,792,510 B2
(45) Date of Patent: Sep. 7, 2010

(54) MULTI-BAND FREQUENCY SYNTHESIZER

(75) Inventors: Alexander Pestryakov, Khimki Moscow Region (RU); Alexej Smirnov, Khimki Moscow Region (RU)

(73) Assignee: Sony Ericsson Mobile Communications AB, Lund (SE)

( * ) Notice: Subject to any disclaimer, the term of this patent is extended or adjusted under 35 U.S.C. 154(b) by 820 days.

(21) Appl. No.: 10/548,552

(22) PCT Filed: Jan. 7, 2004

(86) PCT No.: PCT/EP2004/000046

§ 371 (c)(1),
(2), (4) Date: Jun. 16, 2006

(87) PCT Pub. No.: WO2004/082160

PCT Pub. Date: Sep. 23, 2004

(65) Prior Publication Data

US 2006/0258311 A1    Nov. 16, 2006

(30) Foreign Application Priority Data

Mar. 11, 2003  (EP)  ................... 03005322

(51) Int. Cl.
*H04B 7/00* (2006.01)
(52) U.S. Cl. .............. 455/260; 455/75; 455/183.1; 455/76; 455/255; 455/165.1; 455/265; 455/147; 455/264; 455/192.1; 455/316; 375/376; 375/344; 375/307; 375/373; 375/375; 327/156; 327/105; 327/57; 327/18; 327/177

(58) Field of Classification Search ............... 455/333, 455/552.1, 76, 165.1, 183.1, 260, 255, 265, 455/75, 147, 264, 192.1, 316; 331/2, 158, 331/175, 25; 327/105, 156, 47, 57, 17, 18, 327/175, 177, 147, 117, 162; 375/141, 376, 375/344, 307, 373, 375; 332/127, 2, 17, 332/25

See application file for complete search history.

(56) References Cited

U.S. PATENT DOCUMENTS

| 3,878,476 A * | 4/1975 | Honore et al. ................. 331/38 |
| 5,301,206 A * | 4/1994 | Ishigaki et al. .............. 375/141 |
| 5,319,799 A * | 6/1994 | Morita ........................ 455/78 |
| 5,408,201 A * | 4/1995 | Uriya ............................ 331/2 |
| 5,451,910 A * | 9/1995 | Guthrie ........................ 331/16 |
| 5,525,936 A * | 6/1996 | Post et al. .................... 331/47 |
| 5,684,648 A * | 11/1997 | Murabayashi ................ 360/39 |
| 6,087,865 A * | 7/2000 | Bradley ....................... 327/117 |
| 6,484,038 B1 * | 11/2002 | Gore et al. .............. 455/552.1 |
| 6,993,314 B2 * | 1/2006 | Lim et al. ................... 455/333 |
| 2003/0155949 A1 * | 8/2003 | Itkin et al. .................. 327/105 |

FOREIGN PATENT DOCUMENTS

| EP | 0964523 | 12/1999 |
| EP | 1148654 | 10/2001 |
| EP | 1170874 | 1/2002 |
| EP | 1320189 | 6/2003 |

OTHER PUBLICATIONS

International Search Report; PCT/EP 20/04000046; Jun. 7, 2004.
Written Opinion of the International Searching Authority; Jun. 7, 2004.

* cited by examiner

*Primary Examiner*—Edward Urban
*Assistant Examiner*—Junpeng Chen
(74) *Attorney, Agent, or Firm*—Myers Bigel Sibley & Sajovec, P.A.

(57) ABSTRACT

A multi-mode PLL frequency synthesizer of a wireless multi-mode transceiver is provided which includes a reference frequency source providing an oscillator signal with a constant reference frequency, a first frequency synthesizer subunit for converting the signal into carrier signals with frequencies in the range of a first frequency band, a second frequency synthesizer subunit for transforming the oscillator signal into carrier signals having frequencies in the range of a second frequency band, and a third frequency synthesizer subunit for converting the oscillator signal into an auxiliary signal with a fixed frequency. The auxiliary signal is used together with the carrier signals of the second frequency band to generate carrier signals with frequencies in the range of a third and fourth frequency band. A frequency divider derives a signal in the range of a fifth frequency band from further intermediate frequency signals supplied by the third frequency synthesizer subunit by dividing the frequency of the auxiliary signal by an integer value.

19 Claims, 3 Drawing Sheets

US 7,792,510 B2

MULTI-BAND FREQUENCY SYNTHESIZER

RELATED APPLICATIONS

Figure 1:
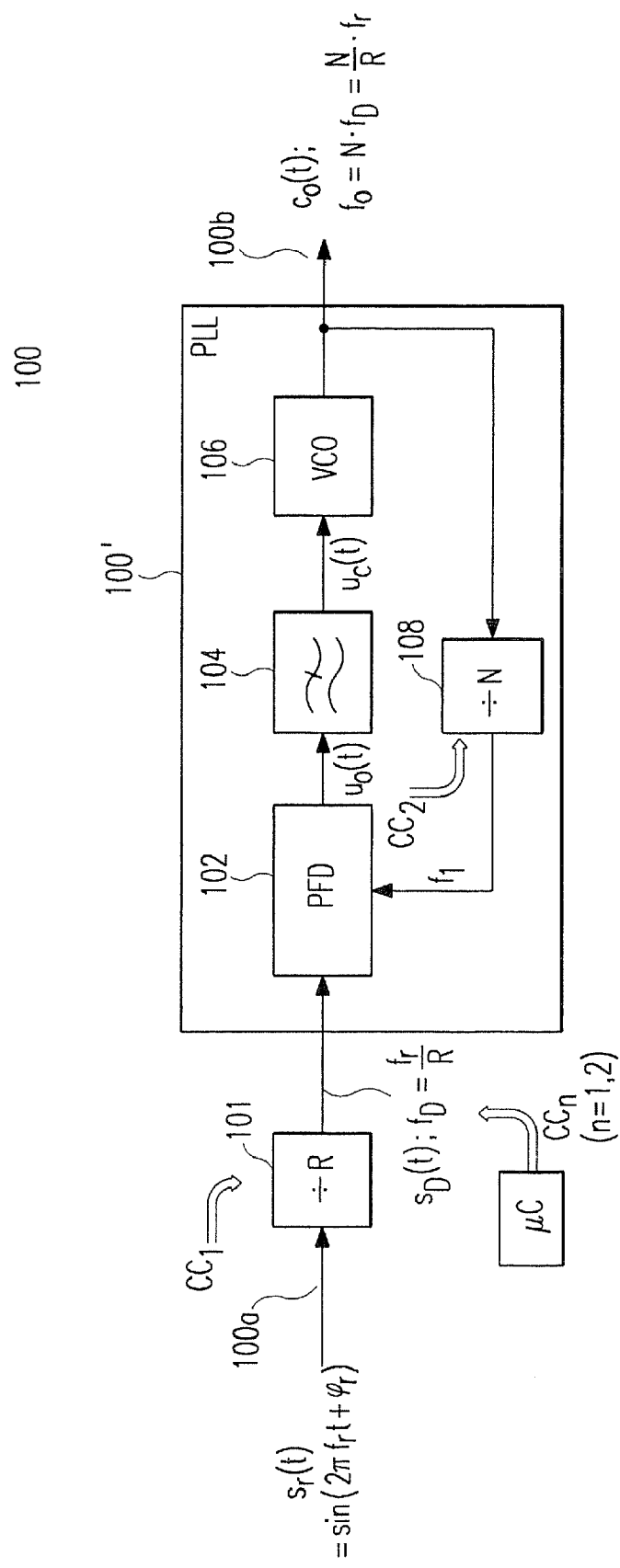

The present application is a 35 U.S.C. §371 national phase application of PCT International Application No. PCT/EP2004/000046, having an international filing date of Jan. 7, 2004, and claiming priority to European Patent Application No. 03005322.7, filed Mar. 11, 2003, the disclosures of which are incorporated herein by reference in their entireties. The above PCT International Application was published in the English language and has International Publication No. WO 2004/082160 A1.

FIELD OF THE INVENTION

The present invention generally relates to the field of multi-band frequency synthesizer architectures, which can advantageously be applied to wireless multi-mode transceivers in a cellular telecommunication system based on f.e. UMTS or GSM/GPRS technology. It particularly refers to a multi-band frequency synthesizer comprising three frequency synthesizer subunits for generating carrier signals with carrier frequencies suitable f.e. for UMTS and GSM/GPRS bands, especially to an extension of the frequency synthesizer architecture of a conventional quad-band transceiver providing additional carrier signals with appropriate carrier frequencies for the GSM/GPRS 850 MHz frequency band.

BACKGROUND OF THE INVENTION

The explosion of the wireless communication in the area of cellular telephony and wireless local area networks (LANs) has led to several wireless standards operating at frequencies ranging from 900 to 5,200 MHz. New generation mobile terminals are equipped to support data transmission via UMTS and GSM/GPRS frequency bands. For this reason, multi-band frequency synthesizers are required which support both UMTS Frequency-Division Duplex (FDD) and UMTS Time-Division Duplex (TDD) frequency bands as well as triple-band functionality (GSM/GPRS 900 MHz, DCS 1,800 MHz, PCS 1,900 MHz) for GSM/GPRS in both uplink (Tx) and downlink (Rx) directions. DCS hereby stands for Digital Cellular System and PCS for Personal Communications Service. Multi-standard transceivers used for these wireless communication systems should be able to operate over a wide frequency range with minimal amounts of replicated hardware components.

A critical element of any wireless transceiver is the integrated frequency synthesizing unit (FSU). A multi-band frequency synthesizer must be able to synthesize a wide range of frequencies for several wireless standards while simultaneously satisfying strict phase noise specifications. This poses a challenging design problem. Typical phase-locked loop (PLL) frequency synthesizers used in wireless transceivers, which reduce the noise power level in the output spectrum of a synthesized carrier signal, are normally designed and optimized for narrowband operation. When such a PLL frequency synthesizer is applied in a multi-mode transceiver, architectural changes have to be made to the typical loop structure in order to achieve operation over a wide frequency range.

A PLL circuit synchronizes an output signal with an input reference signal generated by a reference frequency source, e.g. a crystal oscillator, by executing a feedback mechanism where the output frequency of a voltage-controlled oscillator (VCO) is locked to the reference frequency. Thereby, an error signal is produced which is proportional to the phase difference of the reference signal and the output signal. The error signal is then filtered in order to generate the VCO's control voltage. The loop is set up in a negative feedback fashion such that the control voltage fed to the input port of the VCO will force the oscillator's output to lock with the input reference signal within certain frequency limits. The rapid advance in integrated circuit technology has led to the use of PLL circuitries in many areas such as wireless communication systems, consumer electronics, and motor control.

FIG. 1 illustrates the principles of a conventional PLL frequency synthesizer subunit 100'. The signals generated at an output port 100b of the subunit constitute either directly a frequency of a respective frequency band or an auxiliary frequency for further processing. The input port 100a of the subunit is supplied with a reference frequency signal $f_r$ generated by a crystal oscillator. In a first stage, the reference frequency $f_r$ is scaled down to $$f_D := \frac{f_r}{R} \text{ (with } R \in \mathbb{N}\text{)} \tag{1}$$

by a division coefficient R, which is set at a control port of a programmable frequency divider 101 by means of a digital control code (CC). The following phase-locked loop frequency synthesizer subunit 100' then adjusts the output frequency $f_o$ of a VCO 106 to the desired value. The PLL frequency synthesizer subunit 100' thereby works in principle like a frequency multiplier with a fixed frequency raster for a certain number of channels, wherein the channel spacing is given by $f_D$. This is achieved by using a programmable integer frequency divider 108 in the feedback line of the PLL frequency synthesizer subunit 100' that scales down the output frequency of the VCO 106 by the integer division coefficient N. Furthermore, the PLL frequency synthesizer subunit 100' comprises a phase/frequency detector 102 (PFD) which provides an output voltage $u_o(t)$ proportional to the phase angle deviation between the input frequency $f_D$ and the down-scaled output frequency $$f_1 := \frac{f_o}{N} \text{ (with } N \in \mathbb{N}\text{)}. \tag{2}$$

This output voltage $u_0(t)$ is filtered by a low-pass filter 104 (LPF) before being supplied to the VCO 106. The filter characteristics of this low-pass filter 104 are wide enough to allow a quick lock time and thus a fast switching of the output frequency when changing between different frequency bands and narrow enough to block off high frequencies which otherwise would cause phase noise in the output spectrum of the VCO 106. The output frequency $f_o$ of the VCO 106 is a function of the value of the filtered output voltage $u_c(t)$ which is supplied to it. In the feedback line of the PLL frequency synthesizer subunit 100', this output frequency $f_o$ is scaled down by an appropriate integer value N to a value equal to that of $f_D$ for being applied to the PFD 102. There, it is compared with the original frequency signal $f_D$ to produce the control voltage $u_0(t)$ for the VCO 106. After termination of the transient processes, the value of the output frequency $f_o$ is controlled by the digital code ($CC_2$) of the integer division coef ficient N set at the programmable frequency divider 108 of the feedback loop according to the following equation:

$$f_o = N \cdot f_D = \frac{N}{R} f_r \text{(with } N, R \in \mathbb{N}\text{)}. \quad (3)$$

According to equation (3), the output frequency $f_o$ is an integer multiple of the input frequency $f_D$ or, in other words, $f_D$ defines a frequency raster for $f_o$. A change in the output frequency $f_o$ can thus be achieved by changing this division coefficient N, a process sufficiently fast to allow fast frequency hopping (FH). As neither spurious harmonics nor additional phase noise are produced by this procedure, no extra filters for a postprocessing of the output spectra of the PLL frequency synthesizer subunit 100' are required.

With the increased interest in multi-mode RF transceiver systems, frequency synthesizers which operate over a multiplicity of frequency bands become a necessity. There are many challenges faced in designing a multi-band CMOS frequency synthesizer. Recent efforts are concentrated on narrowband single-mode frequency synthesizers which do not have the frequency range necessary for multi-band systems. Conventional prior-art solutions apply a double-loop architecture to obtain a wide frequency range. However, this double-loop architecture requires effectively twice the chip area as a standard single-loop PLL circuitry. Typical dual-band synthesizers utilize a multiplicity of phase-locked loops with narrowband voltage-controlled oscillators that operate at different center frequencies.

A multi-band frequency synthesizer should be realized in a manner that does not increase the loop complexity significantly. An optimal design would be implemented in a typical CMOS process using the power supplies typically found in multiple products. An approach that minimizes the amount of replicated circuitry is to increase the tuning range of the VCO in such a way that the PLL loop dynamics are not drastically affected.

Integrated voltage-controlled oscillators used in PLL-based frequency synthesizers generally have limited tuning ranges or conversion gains. The most common integrated VCO used in RF systems is the LC oscillator due to its superior phase noise performance. However, this oscillator suffers from a very limited tuning range because it is tuned with varactor capacitors that generally make up only 25% of the total capacitance. One way to increase the tuning range of the VCO is to discretely switch in different capacitive or inductive loads. The use of switched tuning elements to increase the oscillator's tuning range is an old design technique that has been deployed in recent research. When the concept of switched tuning is applied, a wide frequency range is realized by splitting the entire range into different bands of operation. The oscillator changes between these bands by discretely switching in different loads, which also aid in reducing the noise power level of the VCO.

The conversion gain of the VCO must be very large to synthesize a wide range of frequencies. However, as such a large conversion gain is not available with conventional integrated VCOs, their output spectra are severely distorted by phase noise. This makes phase-locked loops with switched tuning voltage-controlled oscillators ideal for a multi-band frequency synthesizer because they can tune over a wide range while simultaneously maintaining a comparatively low conversion gain.

Nowadays, implementations of multi-band frequency synthesizers are based on the usage of independent frequency synthesizers for UMTS applications, one for the uplink, one for the downlink, and a third one for triple-band GSM/GPRS. To achieve the necessary class 12 settling time for GPRS ($T_S$<150 μs), fractional-N frequency synthesizers are commonly used. The greatest advantage of said fractional-N frequency synthesizers is their fast settling time when e.g. switching from an uplink to a downlink frequency band or at an intersystem handover, which fulfills one of the preconditions for a reliable GPRS data transmission. The main drawback of all classes of fractional-N frequency synthesizers is their bad output spectrum performance which is characterized by high phase noise and a high amount of spurious harmonics. Especially when receiving low-level signals, this can be very problematic. When using fractional-N frequency synthesizers, the requirements of the GSM standard 0505 can only be achieved by postprocessing the output spectra with high-quality filters, which are bulky and cost-intensive.

From the prior European patent application EP 01 129 616.7 of the same applicant a frequency synthesizer arrangement for generating signals with carrier frequencies for UMTS and GSM/GPRS frequency bands and a mobile terminal with a respective frequency synthesizer arrangement are known. Said frequency synthesizer arrangement comprises a reference frequency source providing a signal of constant reference frequency, a first frequency synthesizer subunit for converting the signal of the reference frequency source into a signal having a frequency in the range of a first frequency band, and a second frequency synthesizer subunit for transforming the signal of the reference frequency source into a signal having a frequency in the range of a second frequency band. The second frequency synthesizer subunit further converts the signal of the reference frequency source into a signal with an intermediate frequency, and a third frequency synthesizer subunit converts the signal of the reference frequency source into an auxiliary signal with a fixed frequency, which is used together with the intermediate frequency signal for generating signals with frequencies in a range of a third and of a fourth frequency band.

The invention described in the European patent application EP 1 170 874 A1 pertains to a wireless RF reception device comprising a reception (Rx) chain with a down-conversion mixer (M1) followed by an analog-to-digital converter (ADC). An oscillator circuit serving as a reference generator (RG) generates a clock signal (RT) which is respectively fed to the analog-to-digital converter (ADC) and PLL frequency synthesizer (PLL1), which are connected to said down-conversion mixer (M1) by a multiplication (MP1) or a division (TL1) stage where the clock rate is multiplied or divided by an integer coefficient, respectively. Hereby, a particularly energy- and chip-area-saving circuitry with negligible mutual signal distortions can be realized, which is especially appropriate for wireless communication systems based on the UMTS standard. According to the preferred embodiment of this invention, said RF reception unit is developed further to an RF transceiver by providing an additional transmission (Tx) chain. The disclosed transceiver architecture can not be applied to multi-mode operation, however, because it does not comprise any multi-band frequency synthesizing unit.

Next, the invention described in the U.S. Pat. No. 5,408, 201 refers to a PLL-based frequency synthesizing circuitry with a reduced power consumption which comprises three PLL subfrequency synthesizers for generating two different output frequencies by using a reference frequency provided by a reference signal source. Said frequency synthesizer can advantageously be used for a digital radio transmitter and receiver such as a radio telephone apparatus using a multiplicity of communication channels of different carrier frequencies or in a TDMA system in which channels need to be switched at high speed. Thereby, said first synthesizer generates a first subfrequency varying in units of a first frequency increment, said second synthesizer generates a second subfrequency varying in units of a second frequency increment being N times the first frequency increment, and said third synthesizer generates a third subfrequency varying in units of the first frequency increment. A first output signal is obtained by mixing the first subfrequency and the second subfrequency, and a second output signal is obtained by mixing the second subfrequency and the third subfrequency.

In the European patent application EP 1 148 654 A1 a wireless RF transmission and reception device is disclosed which enables operation modes based on frequency-division duplex (FDD) and time-division duplex (TDD) and can advantageously be used in a wireless communication system based on the UMTS standard. The proposed unit can also be operated in the GSM/GPRS 900 MHz and the GSM/GPRS (DCS) 1800 MHz frequency band but not 7 in the GSM/GPRS (PCS) 1900 MHz frequency band. In the RF reception chain a received modulated RF signal is firs down-converted to a first intermediate frequency between 0 and 0.5 MHz of a first intermediate frequency stage before it is further down-converted to the baseband, and in the transmission chain a baseband signal to be transmitted is first up-converted to a second intermediate frequency of 190 MHz of a second intermediate frequency stage before it is then further up-converted to the passband. The device needs three local oscillators to produce the carrier signals needed for the signal up- and down-conversion in the transmit (Tx) and receive (Rx) chain, respectively. In case of limited-bandwidth operation, the disclosed transceiver architecture requires only two local oscillators—a first oscillator connected to the up-conversion mixer of the RF transmission chain and a second one connected to the down-conversion mixer of the RF reception chain—and can thus be operated in an energy-saving mode. Thereby, said second intermediate frequency can be tuned by ±5 or ±10 MHz, respectively. In this connection, it should be noted that the applied frequency combining means are not used to achieve a better performance of the frequency synthesizer.

Besides, the invention described in the European patent application EP 0 964 523 A1 pertains to a wireless RF transceiver system including two single-loop PPL frequency synthesizers, that do not use any frequency combining means to achieve a better performance, as well as one modulation loop to respectively transmit and receive signals in the GSM/GPRS 900 MHz and GSM/GPRS (DCS) 1,800 MHz frequency bands. The invention thereby does not employ any frequency synthesizers for generating carrier frequencies to be used in the UMTS frequency bands. To bring about frequency hops, the frequencies in the aforementioned two loops are varied with large increments in opposite directions. It is shown that the obtained noise power level caused by the frequency division in said loops is thereby significantly reduced.

SUMMARY OF THE INVENTION

The underlying invention generally relates to the field of multi-band frequency synthesizer architectures with an improved phase noise performance, that can advantageously be applied to wireless RF transceivers in a cellular telecommunication system based on UMTS or GSM/GPRS technology, in particular to an extension of a multi-band frequency synthesizer of a wireless quad-band transceiver comprising three frequency synthesizer subunits used for generating tunable carrier signals with different requirements, especially with regard to settling time and spectral performance. The frequencies generated by said multi-band frequency synthesizer are located in different frequency bands, which are assigned to the up- and downlink channels of a number of wireless communication standards (f.e. GSM/GPRS 850 MHz, GSM/GPRS 900 MHz, GSM/GPRS 1,800 MHz, GSM/GPRS 1,900 MHz, UMTS TDD1+2, UMTS FDD), respectively.

In contrast to the PLL-based frequency synthesizing unit described in U.S. Pat. No. 5,408,201, the main idea of the present invention is to provide several circuits with different parameters in order to generate carrier signals which are needed for wireless communication systems based on the GSM/GPRS or the UMTS standard. The main advantage of the proposed approach is the fact that each frequency synthesizer subunit is assigned to an individual frequency range which does not interfere with the frequency ranges of other existing radio communication systems. In contrast to the invention described in EP 1 148 654 A1, the proposed solution according to the present invention covers not only f.e. UMTS but also all f.e. GSM/GPRS transmit (Tx) and receive bands (Rx).

BRIEF DESCRIPTION OF TEE DRAWINGS

Advantageous features and aspects of the present invention will become evident from the following description, the appended claims, and the accompanying drawings, wherein the invention is explained in more detail. Thereby, FIG. 1 shows a schematic block diagram of a frequency synthesizer subunit according to the present invention, FIG. 2 shows a schematic block diagram of a multi-band frequency synthesizer of a wireless quad-band transceiver according to the present invention, and FIG. 3 shows the frequency plan of the multi-band frequency synthesizer according to the present invention, encompassing the frequency bands used for the uplink and/or the downlink channels of the GSM/GPRS 850 MHz, the GSM/GPRS 900 MHz, the GSM/GPRS (DCS) 1,800 MHz, the GSM/GPRS (PCS) 1,900 MHz, and the UMTS standard, respectively.

DETAILED DESCRIPTION OF EMBODIMENTS OF THE INVENTION

Figure 2:
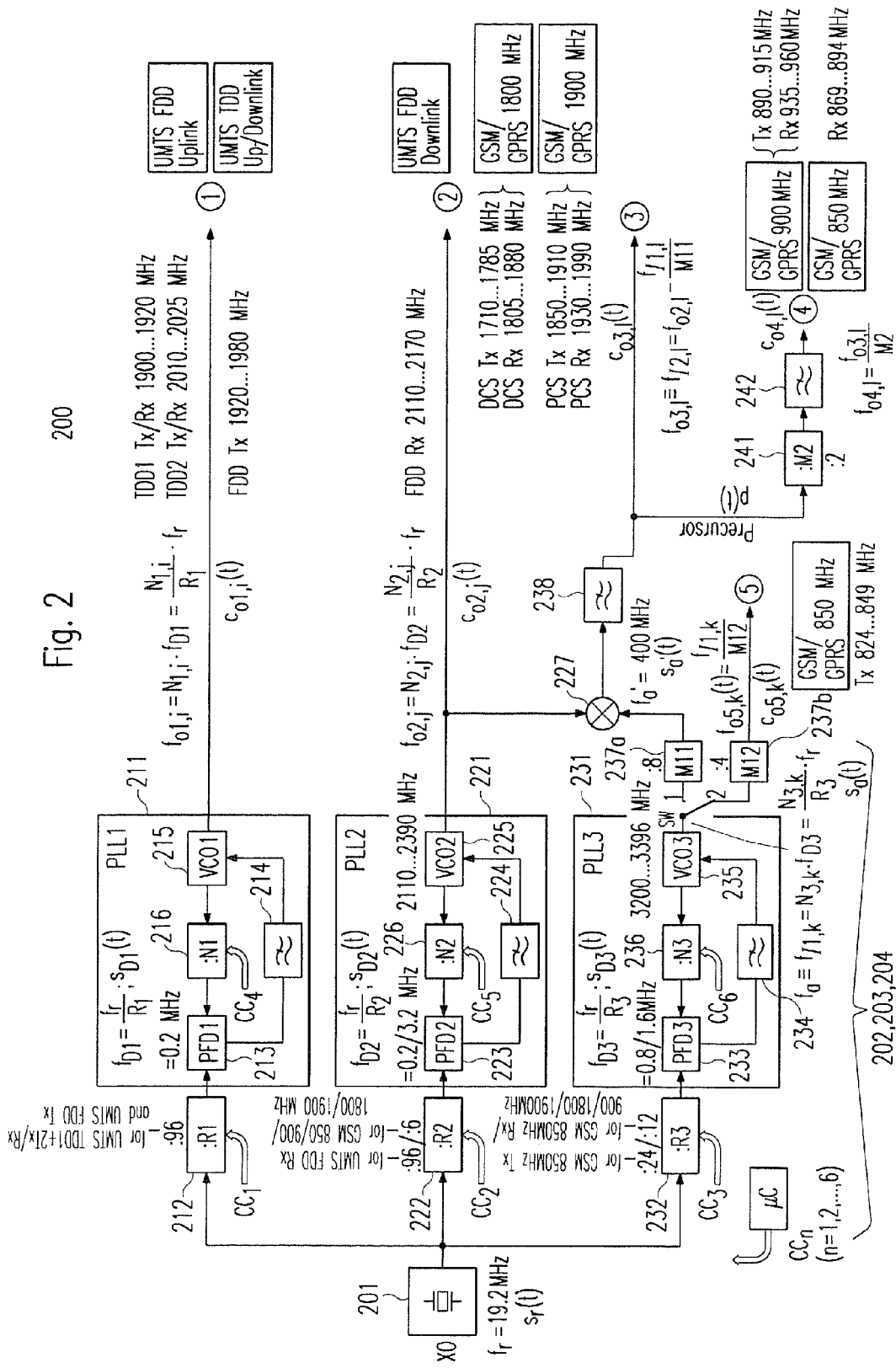
Figure 3:
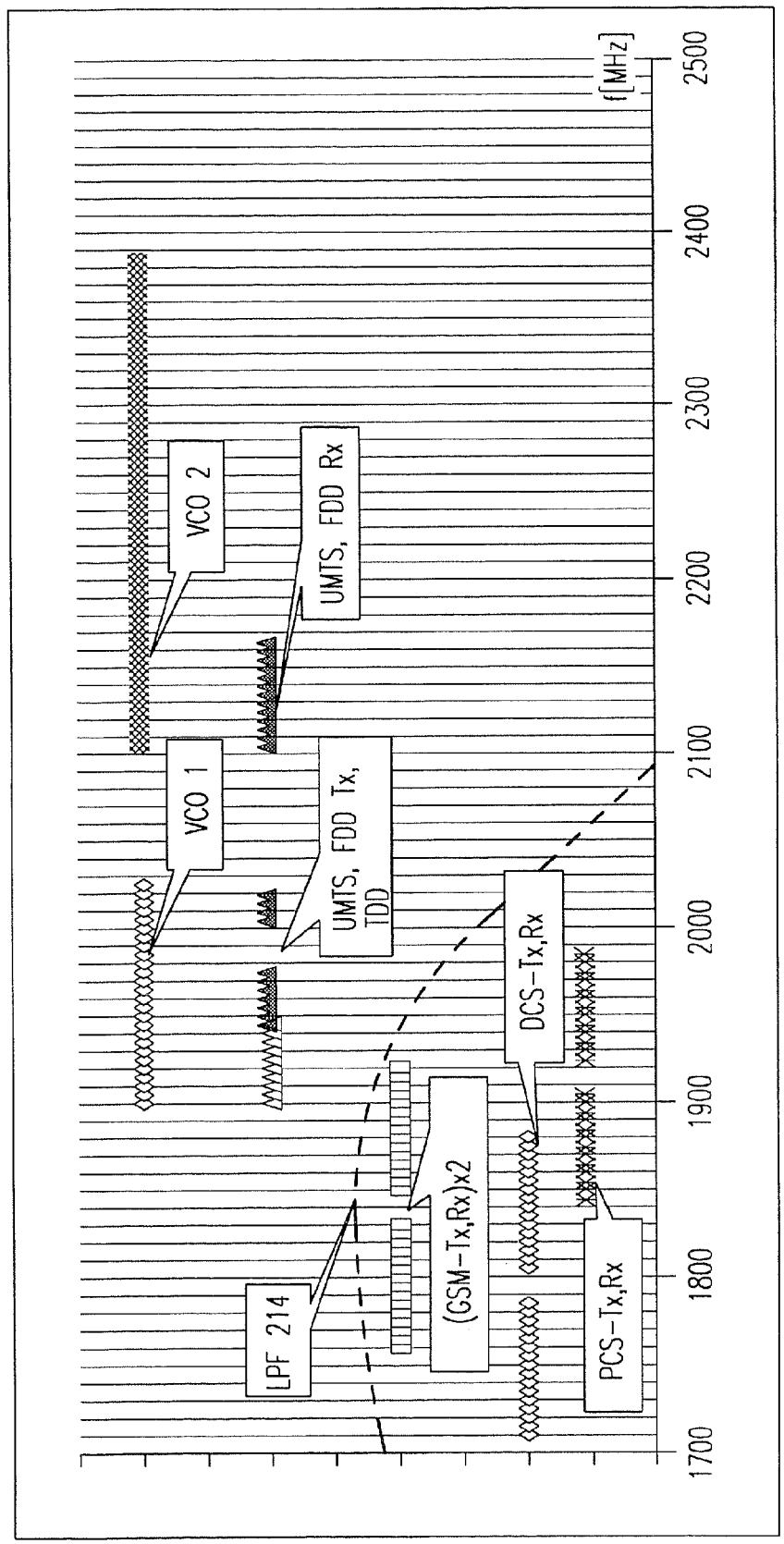

In the following, one embodiment of the underlying invention as depicted in FIG. 2 shall be explained in detail.

The embodiment implements a method for operating a multi-band frequency synthesizer 200 of a wireless multi-mode transceiver for generating tunable carrier signals $c_{o1,i}(t)$, $c_{o2,j}(t)$, $c_{o3,i}(t)$, and $c_{o4,i}(t)$ whose frequencies $f_{o1,i}$, $f_{o2,j}$, $f_{o3,i}$, and $f_{o4,i}$ are located in different frequency bands and assigned to the up- and downlink channels of a number of wireless communication standards (f.e. GSM/GPRS 900 MHz Tx/Rx, GSM/GPRS (DCS) 1,800 MD Tx/Rx, GSM/GPRS (PCS) 1,900 MHz Tx/Rx, UMTS TDD1 Tx/Rx, UMTS TDD2 Tx/Rx, and UMTS FDD Tx/Rx), respectively. The method comprises the steps of providing (S1) an oscillator signal $s_r(t)$ with a constant reference frequency $f_r$ of 19.2 MHz, converting (S2) said oscillator signal $s_r(t)$ into a first carrier signal $c_{o1,i}(t)$ having a frequency $f_{o1,i}$ in the range of a first frequency band (UMTS TDD1+2 Tx/Rx, UMTS FDD Tx), and converting (S2') said oscillator signal $s_r(t)$ into a second carrier signal $c_{o2,j}(t)$ having a frequency $f_{o2,j}$ in the range of a second frequency band (UMTS FDD Rx). Moreover, said oscillator signal $s_r(t)$ is transformed (S2") into an auxiliary signal $s_a(t)$ having a fixed intermediate frequency $f_a$, which is used together with the second carrier signal $c_{o2,j}(t)$ to generate a third and fourth carrier signal $c_{o3,l}(t)$ and $c_{o4,l}(t)$, respectively, with frequencies $f_{o3,l}$ and $f_{o4,l}$ in the range of a third (GSM/GPRS (DCS) 1,800 MHz Tx/Rx, GSM/GPRS (PCS) 1,900 MHz Tx/Rx) and a fourth frequency band (GSM/GPRS 900 MHz Tx/Rx or GSM/GPRS 850 MHz Rx).

In an additional step the intermediate frequency $f_a$ of said auxiliary signal $s_a(t)$ is selectively divided (S3) by a first integer coefficient $M_{11}$, which can f.e. be set to 8, thereby deriving a further, down-scaled auxiliary signal $s_a'(t)$ with an intermediate frequency $f_a'$ used for generating said third and fourth carrier signal $c_{o3,l}(t)$ and $c_{o4,l}(t)$, respectively, or dividing (S4) the intermediate frequency $f_a$ of the auxiliary signal $s_a(t)$ by a second integer coefficient $M_{12}$, which can f.e. be set to 4, thereby deriving a fifth carrier signal $c_{o5,k}(t)$ with a frequency $f_{o5,k}$ in the range of a fifth frequency band (GSM/GPRS 850 MHz Tx).

In accordance with a further embodiment of the present invention, said method additionally comprises the step of setting (S6a) the integer coefficient $R_3$ of a frequency divider 232 preceding a third PLL frequency synthesizer subunit 204 of said multi-band PLL frequency synthesizer to a first value ($R_{3,1}:=12$), thereby yielding a first channel raster with a predefined first channel spacing $f_{D3,1}$ of 1.6 MHz between the synthesized carrier frequencies $f_{o3,l}$ and $f_{o4,l}$ of said third (GSM/GPRS (DCS) 1,800 MHz Tx/Rx or GSM/GPRS (PCS) 1,900 MHz Tx/Rx) and said fourth frequency band (GSM/GPRS 900 MHz Tx/Rx or GSM/GPRS 850 Mz Rx), respectively. Alternatively, the integer coefficient $R_3$ of said frequency divider 232 is set (S6b) to a second value (f.e. $R_{3,2}:=24$) yielding a second channel raster with a predefined second channel spacing $f_{D3,2}$ of f.e. 0.8 MHz between the synthesized carrier frequencies $f_{o5,k}$ of said fifth frequency band (GSM/GPRS 850 MHz Tx).

In accordance with a further embodiment, said oscillator signal $s_r(t)$ is converted (S7) into three different down-scaled signals $s_{D1}(t)$, $s_{D2}(t)$, and $s_{D3}(t)$, respectively, whose frequency values $f_{D1}$, $f_{D2}$, and $f_{D3}$ represent the reference frequency $f_r$ divided by one of a number of different integer coefficients $R_1$, $R_2$, or $R_3$, respectively:

$$f_{Dm} := \frac{f_r}{R_m} \text{ for } m \in \{1, 2, 3\}. \tag{4}$$

After that, these down-scaled signals $s_{D1}(t)$, $s_{D2}(t)$, and $s_{D3}(t)$ are converted (S8) into three signals $c_{o1,i}(t)$, $c_{o2,j}(t)$, and $s_{I1,k}(t)$, respectively, whose frequencies $f_{o1,i}$, $f_{o2,j}$, and $f_{I1,k}$ are integer multiples $N_{1,i}$, $N_{2,j}$, or $N_{3,k}$ of the down-scaled signals $s_{D1}(t)$, $s_{D2}(t)$, or $s_{D3}(t)$:

$$f_{o1,i} := N_{1,i} \cdot f_{D1} = \tag{5a}$$
$$\frac{N_{1,i}}{R_1} \cdot f_r \forall i(N_{1,i}, R_1 \in \mathbb{N} \text{ and } N_{1,i} \in \{N_{1,\min}, \ldots, N_{1,\max}\}),$$

$$f_{o2,j} := N_{2,j} \cdot f_{D2} = \tag{5b}$$
$$\frac{N_{2,j}}{R_2} \cdot f_r \forall j(N_{2,j}, R_2 \in \mathbb{N} \text{ and } N_{2,j} \in \{N_{2,\min}, \ldots, N_{2,\max}\}),$$

$$f_{I1,k} \equiv f_a := N_{3,k} \cdot f_{D3} = \tag{5c}$$
$$\frac{N_{3,k}}{R_3} \cdot f_r \forall k(N_{3,k}, R_3 \in \mathbb{N} \text{ and } N_{3,k} \in \{N_{3,\min}, \ldots, N_{3,\max}\}).$$

Thereby, i, j, and k denote the channel indices assigned to the frequencies $f_{o1,i}$ and $f_{o2,j}$ of the two carrier signals $c_{o1,i}(t)$ and $c_{o2,j}(t)$ at the output ports ① and ② of the multi-band frequency synthesizer 200 as well as the frequency $f_{I1,k}$ ($\equiv f_a$) of the auxiliary signal $s_a(t)$, respectively. Thereby, $f_{I1,k}$ is used to obtain the frequencies $f_{o5,k}$ of the carrier signals $c_{o5,k}(t)$ in the range of said fifth frequency band (GSM/GPRS 850 MHz Tx):

$$f_{o5,k} := \frac{f_{I1,k}}{M_{12}} \forall k (\text{with } M_{12} \in \mathbb{N}). \tag{6}$$

The proposed method further pertains to the step of mixing (S9) the carrier signal $c_{o2,j}(t)$ supplied by the second frequency synthesizer subunit 203 with the down-scaled auxiliary signal $s_a'(t)$ to form carrier signals $c_{o3,l}(t)$ with the frequencies $$f_{o3,l} \equiv f_{l2,l} := f_{o2,l} - \frac{f_{I1,l}}{M_{11}} \forall l (\text{with } l := \text{Min}(j, k), M_{11} \in \mathbb{N}) \tag{7}$$

in the range of said third frequency band (DCS Tx, DCS Rx, PCS Tx, PCS Rx) or a precursor signal $p(t)$ needed for deriving a signal $c_{o4,l}(t)$ in the range of the fourth frequency band (GSM/GPRS 900 MB Tx/Rx or GSM/GPRS 850 MHz Rx). To derive a certain carrier signal $c_{o4,l}(t)$ with a frequency $f_{o4,l}$ in the range of said fourth frequency band (GSM/GPRS 900 MD Tx/Rx or GSM/GPRS 850 MHz Rx), the frequency $f_{o3,l}$ of the signal $c_{o3,l}(t)$ supplied after the mixing operation (S9) has taken place is divided (S10) by a further integer value ($M_2$):

$$f_{o4,l} := N \cdot \frac{f_{o3,l}}{M_2} \forall l (\text{with } M_2 \in \mathbb{N}). \tag{8}$$

According to a further embodiment of the present invention, the signal supplied after the mixing operation (S9) has taken place is low-pass filtered (11a) to eliminate spurious harmonics in the spectrum of a generated carrier signal $c_{o3,l}(t)$ in the range of said third frequency band (GSM/GPRS (DCS) 1,800 MHz Tx/Rx and GSM/GPRS (PCS) 1,900 MHz Tx/Rx). Likewise, spurious harmonics in the spectrum of a generated carrier signal $c_{o4,l}(t)$ in the range of said fourth frequency band (GSM/GPRS 900 MHz Tx/Rx or GSM/GPRS 850 MHz Rx) are eliminated by low-pass filtering (S11b) said fourth carrier signal $c_{o4,l}(t)$.

A multi-band frequency synthesizer unit 200 according to the present invention is shown in FIG. 2. It is applied to a wireless quad-band transceiver used for generating tunable carrier signals $c_{o1,i}(t)$, $c_{o2,j}(t)$, $c_{o3,l}(t)$, and $c_{o4,l}(t)$ whose frequencies $f_{o1,i}$, $f_{o2,j}$, $f_{o3,l}$, or $f_{o4,l}$, respectively, are located in frequency bands assigned to the uplink and downlink channels of a number of wireless communication standards (GSM/GPRS 900 MHz, GSM/GPRS (DCS) 1,800 MHz, GSM/GPRS (PCS) 1,900 MHz, and UMTS), respectively. The depicted multi-band PLL frequency synthesizer 200 comprises a crystal oscillator (XO) serving as a reference frequency source 201, which provides an oscillator signal $s_r(t)$ of a constant reference frequency $f_r$ of f.e. 19.2 MHz, a first frequency synthesizer subunit 202 designed to convert the oscillator signal $s_r(t)$ into a first carrier signal $c_{o1,i}(t)$ with a frequency $f_{o1,i}$ in the range of a first frequency band (UMTS TDD1+2 Tx/Rx, UMTS FDD Tx), and a second frequency synthesizer subunit 203 designed to convert said oscillator signal $s_r(t)$ into a second carrier signal $c_{o2,j}(t)$ with a frequency $f_{o2,j}$ in the range of a second frequency band (UMTS FDD Rx). Furthermore, a third frequency synthesizer subunit 204 is designed to transform the oscillator signal $s_r(t)$ into an auxiliary signal $s_a(t)$ with a fixed intermediate frequency $f_a$, that is used together with the second carrier signal $c_{o2,j}(t)$ branched off as an intermediate frequency signal to generate a third and fourth carrier signal $c_{o3,i}(t)$ and $c_{o4,i}(t)$, respectively, with frequencies $f_{o3,i}$ and $f_{o4,i}$ in the range of a third (GSM/GPRS (DCS) 1,800 MHz Tx/Rx, GSM/GPRS (PCS) 1,900 MHz Tx/Rx) and fourth frequency baud (GSM/GPRS 900 MHz Tx/Rx or GSM/GPRS 850 MHz Rx), respectively. According to the proposed solution of the invention, said frequency synthesizer 200 additionally comprises a first frequency divider 237a for dividing the intermediate frequency $f_a$ of said auxiliary signal $s_a(t)$ by a first integer coefficient $M_{12}$, which can f.e. be set to 8, thereby deriving a further, down-scaled auxiliary signal $s_a'(t)$ with an intermediate frequency $f_a'$, that is needed for generating said third and said fourth carrier signal $c_{o3,i}(t)$ and $c_{o4,i}(t)$, respectively. A second frequency divider 237b is used for dividing the intermediate frequency $f_a$ of the auxiliary signal $s_a(t)$ by a second integer coefficient $M_{12}$, which can f.e. be set to 4, thereby deriving a fifth carrier signal $c_{o5,k}(t)$ with a frequency $f_{o5,k}$ in the range of a fifth frequency band (GSM/GPRS 850 MHz Tx). Finally, switching means (SW) are provided for selectively connecting either said first frequency divider 237a or said second frequency divider 237b to the output port of the third frequency synthesizer subunit 204.

Different from the first PLL frequency synthesizer subunit 202, the second PLL frequency synthesizer subunit 203 operates alternately at two different input frequencies supplied by the preceding phase/frequency divider 223 (PFD2). The UMTS downlink frequencies are provided by integer multiples of a first input frequency $f_{D2,1}$ of f.e. 0.2 MHz; the intermediate frequency signals $c_{o2,j}(t)$ forming a basis for the provision of the GSM/GPRS bands are provided by integer multiples $N_{2,j}$ of a second input frequency $f_{D2,2}$ of f.e. 3.2 MHz. This positively affects the settling time and phase noise for the GSM/GPRS frequency bands.

The third PLL frequency synthesizer subunit 204 has a narrow bandwidth of f.e. about 24 MHz and processes a high frequency at the phase/frequency detector 233 (PFD3), which reduces settling time and phase noise. The frequency divider 237a at its output port scales down the output frequency and also the frequency steps of the third PLL frequency synthesizer subunit 204 by a factor of $M_{11}$. This reduces the phase noise even further.

In one embodiment of the present invention, integer-N dual RF/IF PLL frequency synthesizers generating either a first frequency of f.e. 1.0 GHz or a second frequency of f.e. 3.0 GHz—e.g. the ADF 4213 developed by Analog Devices (AD) or any compatible PLL frequency synthesizers—are used as said first, second, and third phase-locked loop frequency synthesizer 211, 221, and 231, respectively. Devices with one or up to four PLL synthesizers in one package can be used. PLL synthesizers from Analog Devices are preferred due to their very short settling times achieved with the built-in so-called "fastlock mode", but devices from other manufacturers may be used as well.

The ADF 4213 is a dual frequency synthesizer which can be used to implement local oscillators in the up- and down-conversion sections of wireless receivers and transmitters. It provides the local oscillator (LO) frequency for both the RF and IF sections. They consist of a low-noise digital phase/frequency detector (PFD), a precision charge pump, a programmable reference divider, programmable 6-bit and 12-bit counters and a dual-modulus prescaler. The 6-bit and 12-bit counters, in conjunction with the dual modulus prescaler, implement an integer-N divider. In addition, a 15-bit reference counter allows selectable frequencies at the PFD input. A complete PLL circuitry can be implemented if the synthesizers are used with an external loop filter, and a VCO controls all the on-chip registers via a simple three-wire interface. The devices operate with a 3 V or 5 V power supply and can be powered down when not in use.

The proposed multi-band PLL frequency synthesizer 200 as shown in FIG. 2 has five output ports, each providing a signal for a certain frequency band. The assignment of these frequency bands to the respective output ports ①to ② of the multi-band frequency synthesizer 200 is shown in the following table:

| Output Port | Frequency Band | Frequency Range [MHz] |
|---|---|---|
| Port ① | UMTS TDD1 Tx/Rx | 1,900 ... 1,920 |
| Port ① | UMTS TDD2 Tx/Rx | 2,010 ... 2,025 |
| Port ① | UMTS FDD Tx | 1,920 ... 1,980 |
| Port ② | UMTS FDD Rx | 2,110 ... 2,170 |
| Port ③ | GSM/GPRS (DCS) 1,800 MHz Tx | 1,710 ... 1,785 |
| Port ③ | GSM/GPRS (DCS) 1,800 MHz Rx | 1,805 ... 1,880 |
| Port ③ | GSM/GPRS (PCS) 1,900 MHz Tx | 1,850 ... 1,910 |
| Port ③ | GSM/GPRS (PCS) 1,900 MHz Rx | 1,930 ... 1,990 |
| Port ④ | GSM/GPRS 900 MHz Tx | 890 ... 915 |
| Port ④ | GSM/GPRS 900 MHz Rx | 935 ... 960 |
| Port ⑤ | GSM/GPRS 850 MHz Tx | 824 ... 849 |
| Port ④ | GSM/GPRS 850 MHz Rx | 869 ... 894 |

The first PLL frequency synthesizer subunit 202 of the multi-band frequency synthesizer 200 produces signals with frequencies for three UMTS bands UMTS FDD Tx (1,920 to 1,980 MHz), UMTS TDD1 Tx/Rx (1,900 to 1920 MHz), and UMTS TDD2 Tx/Rx (2,010 to 2,025 MHz), respectively. The programmable frequency divider 212 scales down the reference frequency $f_r$ by a factor $R_1$. Thereby, the integer $R_1$ is set to 96, which yields a frequency signal $f_{D1}$ of 0.2 MHz at its output port. The code division coefficient $R_1$ is set, like for all other programmable frequency dividers 222, 232, 216, 226, and 236 used in the multi-band PLL frequency synthesizer circuitry 200 shown in FIG. 2, by means of a digital control code ($CC_1, \ldots, CC_6$).

The digital code $CC_1$ of the integer division coefficient $N_{1,i}$ applied to the feedback line of the first PLL frequency synthesizer subunit 202 (PLL1) succeeding the programmable frequency divider 212 is programmably adjustable for producing the desired frequency of the output signal $f_{o1,i}$ according to equation (5a). For the UMTS TDD1 Tx/Rx and UMTS FDD Tx frequency bands ranging from 1,900 to 1,980 MHz, the values of $N_{1,i}$ range from 9,500 to 9,900, whereby incrementing $N_{1,i}$ by a value of 1 results in an incrementation of $f_{o1,i}$ by a channel spacing $f_{D1}$ of 0.2 MHz. For the UMTS TDD2 Tx/Rx frequency band ranging from 2,010 to 2,025 MHz, the values of $N_{1,i}$ have to be adjusted in the interval beginning with 10,050 and ending at 10,125.

When operating in the UMTS FDD Rx frequency band ranging from 2,110 to 2,170 MHz as a first mode, the carrier signal $c_{o2,j}(t)$ supplied by the second PLL frequency synthesizer subunit 203 (PLL2) is fed to the second output port of the multi-band PLL frequency synthesizer 200. To this end, the programmable frequency divider 222 of PLL2 scales down the reference frequency $f_r$ by a factor $R_2$ set to a first value $R_{2,1}:=96$ equal to $R_1$. The resulting signal is then multiplied in PLL2, whereby the multiplication factor is controlled by the digital code ($CC_2$) of the integer division coefficient $N_{2,j}$ applied to the feedback loop. The values of $N_{2,j}$ thereby range from 10,550 to 10,850. The frequency raster of the output frequency $f_{o2,j}$ or the possible incremental changes of $f_{o2,j}$, respectively, are thus fixed to frequency increments given by a first channel spacing $f_{D2,1}$ of 0.2 MHz.

Besides, PLL2 can be operated in a second mode to generate carrier frequencies $f_{o2,j}$ appropriate for deriving the GSM/GPRS (DCS) 1,800 MHz Tx/Rx and GSM/GPRS (PCS) 1,900 MHz Tx/Rx frequency bands. In this mode, the programmable frequency divider 222 scales down the reference frequency $f_r$ by a factor $R_2$ set to a second value $R_{2,2}:=6$, thereby supplying PLL2 with an input frequency of $f_{D2,2}$ of 3.2 MHz. This frequency is multiplied by PLL2 to frequencies $f_{o2,j}$ in the range of 2,110 to 2,390 MHz with a channel raster having a predefined second channel spacing $f_{D2,2}$ of 3.2 MHz. The large frequency steps guarantee a short settling time together with a low phase noise also for the GSM/GPRS carrier signals.

According to one embodiment of the present invention, a third programmable control code ($CC_3$), supplied by a control means (µC), is fed to a control input port of the frequency divider 232 preceding said third frequency synthesizer subunit 204. In case of a first switch position (1) of the aforementioned switching means (SW), the integer coefficient $R_3$ of the frequency divider 232 preceding said third frequency synthesizer subunit 204 is thereby set to a first integer value $R_{3,1}:=12$ yielding a first channel raster with a predefined first channel spacing $f_{D3,1}$ of 1.6 MHz between the synthesized carrier frequencies $f_{o3,l}$ and $f_{o4,l}$ of the third (GSM/GPRS (DCS) 1,800 MHz Tx/Rx, GSM/GPRS (PCS) 1,900 MHz Tx/Rx) and fourth frequency band (GSM/GPRS 900 MHz Tx/Rx or GSM/GPRS 850 MHz Rx), respectively. In case of a second switch position (2) of said switching means (SW), the integer coefficient $R_3$ of said frequency divider (232) is set to a second integer value $R_{3,2}:=24$ yielding a second channel raster with a predefined second channel spacing $f_{D3,2}$ of 0.8 MHz between the synthesized carrier frequencies $f_{o5,k}$ of the fifth frequency band (GSM/GPRS 850 MHz Tx).

In accordance with one embodiment of the present invention, each of said frequency synthesizer subunits 202, 203, and 204 respectively comprises a frequency divider 212, 222, or 232 for transforming said oscillator signal $s_r(t)$ into down-scaled signals $s_{D1}(t)$, $s_{D2}(t)$, $s_{D3}(t)$ whose frequency values $f_{D1}$, $f_{D2}$, $f_{D3}$ represent said reference frequency $f_r$ divided by one of a number of integer coefficients $R_1$, $R_2$, or $R_3$. Moreover, each of said frequency synthesizer subunits 202, 203, and 204 respectively comprises a PLL frequency synthesizer 211, 221, or 231 for converting said down-scaled signals $s_{D1}(t)$, $s_{D2}(t)$, and $s_{D3}(t)$ into signals $c_{o1,i}(t)$, $c_{o2,j}(t)$, and $s_{f1,k}(t)$ whose frequencies $f_{o1,i}$, $f_{o2,j}$, and $f_{f1,k}$ are integer multiples $N_{1,i}$, $N_{2,j}$, or $N_{3,k}$ of the down-scaled signals $s_{D1}(t)$, $s_{D2}(t)$, and $s_{D3}(t)$, respectively.

The multi-band PLL frequency synthesizer as depicted in FIG. 2 further comprises a frequency mixer 227 which mixes the signal $c_{o2,j}(t)$ supplied by the second frequency synthesizer subunit 203 with the down-scaled auxiliary signal $s_a'(t)$ to form a carrier signal $c_{o3,l}(t)$ with a frequency $f_{o3,l}$ in the range of said third frequency band (GSM/GPRS (DCS) 1,800 MHz Tx/Rx and GSM/GPRS (PCS) 1,900 MHz Tx/Rx).

According to a flirter embodiment of the present invention, a first low-pass filter 238 is applied to eliminate spurious harmonics caused by the frequency mixer 227 for generating carrier signals $c_{o3,l}(t)$ and $c_{o4,l}(t)$ with frequencies $f_{o3,l}$ or $f_{o4,l}$ in the range of the third (GSM/GPRS (DCS) 1,800 MHz Tx/Rx, GSM/GPRS PCS) 1,900 MHz Tx/Rx) or the fourth frequency band (GSM/GPRS 900 MHz Tx/Rx or GSM/GPRS 850 MHz Rx), respectively. Furthermore, a second low-pass filter 242 is used to eliminate spurious harmonics caused by the second frequency divider 241 providing said fourth carrier signal $c_{o4,l}(t)$.

The relations between the division coefficients $N_{2,j}$, the obtained frequency band of the output signal $c_{o2,j}(t)$ of PLL2 at port ② and the desired GSM/GPRS frequency band at port ③ of the multi-band PLL frequency synthesizer 200 is shown in the following table:

| Division Coefficient $N_{2,j}$ | Output Frequency $f_{o2,j}$ [MHz] | Frequency Band at Port ③ [MHz] | Frequency Range [MHz] |
|---|---|---|---|
| 659 … 683 | 2,110 … 2,185 | GSM/GPRS (DCS) 1,800 MHz Tx | 1,710 … 1,785 |
| 689 … 713 | 2,205 … 2,280 | GSM/GPRS (DCS) 1,800 MHz Rx | 1,805 … 1,880 |
| 703 … 722 | 2,250 … 2,310 | GSM/GPRS (PCS) 1,900 MHz Tx | 1,850 … 1,910 |
| 728 … 747 | 2,330 … 2,390 | GSM/GPRS (PCS) 1,900 MHz Rx | 1,930 … 1,990 |

To derive a carrier signal $c_{o4,l}(t)$ in the range of the fourth frequency band (GSM/GPRS 900 MHz Tx/Rx or GSM/GPRS 850 MHz Rx), the obtained carrier signal $c_{o3,l}(t)$ supplied by the frequency mixer 227 is branched off as a precursor signal p(t) whose frequency $f_{o3,l}$ is divided by a further integer value $M_2$, which is set to 2. The relations between the division coefficient $N_{3,j}$, the frequency band of the output signal $f_{o2,j}$ of PLL2 at port ② and the desired GSM/GPRS frequency band at port ② of the multi-band PLL frequency synthesizer 200 are shown in the following table:

| Division Coefficient $N_{2,j}$ | Output Frequency $f_{o2,j}$ [MHz] | Precursor Range [MHz] | Frequency Bands [MHz] at Port ④ | Frequency Range [MHz] |
|---|---|---|---|---|
| 681 … 697 | 2,180 … 2,230 | 1,780 … 1,830 | GSM/GPRS 900 MHz Tx | 890 … 915 |
| 709 … 725 | 2,270 … 2,320 | 1,870 … 1,920 | GSM/GPRS 900 MHz Rx | 935 … 960 |

According to one embodiment of the present invention, said third PLL frequency synthesizer subunit 204 comprises a tunable voltage-controlled oscillator 235 whose output frequency $f_{VCO3}$ can be varied in such a way that the intermediate frequency $f_a$ of the generated auxiliary signal $s_a(t)$ obtained at the output port of said third frequency synthesizer subunit 204 can be used to derive carrier signals $c_{o3,l}(t)$, $c_{o4,l}(t)$, and $c_{o5,k}(t)$ with frequencies $f_{o3,l}$, $f_{o4,l}$ or $f_{o5,k}$ in the range of said third (GSM/GPRS (DCS) 1,800 MHz Tx/Rx, GSM/GPRS PCS) 1,900 MHz Tx/Rx), fourth (GSM/GPRS 900 MHz Tx/Rx, GSM/GPRS 850 MHz Rx), or fifth frequency band (GSM/GPRS 850 MHz Tx), respectively. As depicted in FIG. 2, the output frequency $f_{VCO3}$ of this tunable voltage-controlled oscillator 235 takes on values from a frequency interval ranging from 3,200 to 3,396 MHz.

The relations between the division coefficients $N_{3,k}$, the obtained frequency band of the auxiliary signal $s_a(t)$ at the output port of PLL3 and the desired GSM/GPRS frequency band at ports ③, ④, and ⑤ of the multi-band PLL frequency synthesizer 200 is shown in the following table:

| Division Coefficient $N_{3,k}$ | Output Frequency $f_a$ [MHz] | Frequency Band at Ports ③, ④, and ⑤ [MHz] | Frequency Range [MHz] |
|---|---|---|---|
| 2,000 | 3,200 | GSM/GPRS (DCS) 1,800 MHz Tx | 1,710 ... 1,785 |
| 2,000 | 3,200 | GSM/GPRS (DCS) 1,800 MHz Rx | 1,805 ... 1,880 |
| 2,000 | 3,200 | GSM/GPRS (PCS) 1,900 MHz Tx | 1,850 ... 1,910 |
| 2,000 | 3,200 | GSM/GPRS (PCS) 1,900 MHz Rx | 1,930 ... 1,990 |
| 2,000 | 3,200 | GSM/GPRS 900 MHz Tx | 890 ... 915 |
| 2,000 | 3,200 | GSM/GPRS 900 MHz Rx | 935 ... 960 |
| 4,120 ... 4,245 | 3,296 ... 3,396 | GSM/GPRS 850 MHz Tx | 824 ... 849 |
| 2,000 | 3,200 | GSM/GPRS 850 MHz Rx | 869 ... 894 |

In accordance with a still further embodiment, the invention is finally related to a wireless multi-mode RF transceiver for generating tunable carrier signals $c_{o1,i}(t)$, $c_{o2,j}(t)$, $c_{o3,l}(t)$, and $c_{o4,l}(t)$ whose frequencies ($f_{o1,i}$, $f_{o2,j}$, $f_{o3,l}$, and $f_{o4,l}$) are located in four different frequency bands (UMTS TDD1, UMTS TDD2 Tx/Rx, UMTS FDD Tx/Rx, GSM/GPRS 900 MHz Tx/Rx, GSM/GPRS (DCS) 1,800 MHz Tx/Rx, and GSM/GPRS (PCS) 1,900 MHz Tx/Rx) used for the up- and downlink channels of a number of wireless telecommunication standards (GSM/GPRS 900 MHz, GSM/GPRS 1,800 MHz, GSM/GPRS 1,900 MHz, UMTS Tx, and UMTS Rx), respectively, which comprises a multi-band phase-locked loop (PLL) frequency synthesizer 200.

A frequency plan of the multi-band PLL frequency synthesizer 200 according to the present invention is shown in FIG. 3. Except for the UMTS frequency bands, which feature a high interference immunity, frequencies produced in one of the VCOs 215, 225, and 235, which also includes spurious harmonics, must not fall into a reception or a transmission band of the multi-band frequency synthesizer 200 to fulfill the requirements of GSM/GPRS standard 0505. This is achieved by using frequencies for the VCOs which lay fairly above the GSM/GPRS frequencies. Likewise, spurious harmonics of the VCO 235—when down-scaled by the digital frequency divider 237a—must not fall into a GSM/GPRS reception or transmission band.

As depicted in FIG. 3, the frequency synthesizer subunits 202, 203, and 204 of said multi-band PLL frequency synthesizer are tuned such that the frequencies $f_{o1,i}$ of said first frequency band (UMTS TDD1+2 Tx/Rx, UMTS FDD Tx) take on values from frequency intervals ranging from 1,900 to 1,920 MHz (UMTS TDD1), 2,010 to 2,025 MHz (UMTS TDD2), and from 1,920 to 1,980 MHz (UMTS FDD Tx), respectively, the frequencies $f_{o2,j}$ of said second frequency band (UMTS FDD Rx) take on values from the frequency interval ranging from 2,110 to 2,170 MHz, the frequencies $f_{o3,l}$ of said third frequency band (GSM/GPRS (DCS) 1,800 MHz Tx/Rx, GSM/GPRS (PCS) 1,900 MHz Tx/Rx) take on values from frequency intervals ranging from 1,710 to 1,785 MHz (DCS Tx), 1,805 to 1,880 MHz (DCS Rx), 1,800 to 1,910 MHz (PCS Tx), or 1,930 to 1,990 MHz (PCS Rx), respectively, the frequencies $f_{o4,l}$ of said fourth frequency band (GSM/GPRS 900 MHz Tx/Rx or GSM/GPRS 850 MHz Rx) take on values from frequency intervals ranging from 890 to 915 MHz (GSM/GPRS 900 MHz Tx), 935 to 960 MHz (GSM/GPRS 900 MHz Rx), or 869 to 894 MHz (GSM/GPRS 850 MHz Rx), respectively, and the frequencies $f_{o5,k}$ of said fifth frequency band (GSM/GPRS 850 MHz Tx) take on values from the frequency interval ranging from 824 to 849 MHz.

The exemplary frequency plan of FIG. 3 further shows the filter characteristic of the low-pass filter 214 (LPF1) indicating that its bandwidth is sufficiently broad to allow a fast switching of frequencies at the VCO 215, but also sufficiently narrow to prevent phase noise in the output spectra of the first PLL frequency synthesizer 211.

The invention claimed is:

1. A method for operating a multi-band frequency synthesizer, comprising the following steps:

providing an oscillator signal with a constant reference frequency;

converting the oscillator signal into a first carrier signal with a frequency in the range of a first frequency band;

converting said oscillator signal into a second carrier signal with a frequency in the range of a second frequency band;

transforming said oscillator signal into an auxiliary signal with a fixed intermediate frequency; and alternately switching between one and the other of the following:

1) dividing the intermediate frequency of said auxiliary signal by a first integer coefficient to generate a down-scaled auxiliary signal and combining the down-scaled auxiliary signal with the second carrier signal to generate third and fourth carrier signals with frequencies in the ranges of different respective third and fourth frequency bands; and 2) dividing the intermediate frequency of the auxiliary signal by a second integer coefficient that is different than the first integer coefficient to generate a fifth carrier signal with a frequency in the range of a fifth frequency band.

2. A method according to claim 1, further comprising:

transforming said oscillator signal into down-scaled signals whose frequency values represent said reference frequency divided by one of a number of different integer coefficients.

3. A method according to claim 2, further comprising:

transforming said down-scaled signals into signals whose frequencies are integer multiples of the down-scaled signals.

4. A method according to claim 3, further comprising:
mixing the carrier signal supplied by a second frequency synthesizer subunit of said multi-band frequency synthesizer with the down-scaled auxiliary signal to form a carrier signal in the range of said third frequency band or a precursor signal needed for deriving a signal in the range of the fourth frequency band.

5. A method according to claim 4, further comprising:
dividing the frequency of the signal supplied after the mixing operation has taken place by a further integer value to derive a signal in the range of said fourth frequency band.

6. A method according to claim 4, further comprising:
low-pass filtering the signal obtained after the mixing operation has taken place to eliminate spurious harmonics in the spectrum of a generated carrier signal in the range of said third frequency band.

7. A method according to claim 5, further comprising:
low-pass filtering said fourth carrier signal to eliminate spurious harmonics in the spectrum of a generated carrier signal in the range of said fourth frequency band.

8. A multi-band frequency synthesizer, comprising:
a reference frequency source providing an oscillator signal with a constant reference frequency;
a first frequency synthesizer subunit that is configured to convert the oscillator signal into a first carrier signal with a frequency in the range of a first frequency band;
a second frequency synthesizer subunit that is configured to convert said oscillator signal into a second carrier signal with a frequency in the range of a second frequency band;
a third frequency synthesizer subunit that is configured to transform the oscillator signal into an auxiliary signal with a fixed intermediate frequency;
a first frequency divider that is configured to divide the intermediate frequency of said auxiliary signal by a first integer coefficient to generate a down-scaled auxiliary signal and to combine the down-scaled auxiliary signal with the second carrier signal to generate third and fourth carrier signals with frequencies in the ranges of different respective third and fourth frequency bands; and
a second frequency divider that is configured to divide the intermediate frequency of the auxiliary signal by a second integer coefficient, that is different than the first integer coefficient to generate a fifth carrier signal with a frequency in the range of a fifth frequency band; and
a switching circuit that is configured to alternately connect said first frequency divider or said second frequency divider to an output port of the third frequency synthesizer subunit.

9. A multi-band frequency synthesizer according to claim 8, further comprising:
control means providing a programmable control signal fed to a control input port of the frequency divider preceding said third frequency synthesizer subunit which,
in case of a first switch position of said switching circuit, sets the integer coefficient of the frequency divider preceding said third frequency synthesizer subunit to a first value yielding a first channel raster with a predefined first channel spacing between the synthesized carrier frequencies of said third and fourth frequency band, respectively, and
in case of a second switch position of said switching circuit, sets the integer coefficient of said frequency divider to a second value yielding a second channel raster with a predefined second channel spacing between the synthesized carrier frequencies of said fifth frequency band.

10. A multi-band frequency synthesizer according to claim 8, wherein each of said frequency synthesizer subunits comprises a frequency divider for transforming said oscillator signal into down-scaled signals whose frequency values represent said reference frequency divided by one of a number of integer coefficients.

11. A multi-band frequency synthesizer according to claim 8, wherein each of said frequency synthesizer subunits comprises a phase-locked loop frequency synthesizer for transforming said down-scaled signals into signals whose frequencies are integer multiples of the down-scaled signals.

12. A multi-band frequency synthesizer according to claim 8, wherein said third frequency synthesizer subunit comprises a tunable voltage-controlled oscillator whose output frequency can be varied in such a way that the intermediate frequency of the generated auxiliary signal obtained at the output port of said third frequency synthesizer subunit can be used to derive carrier signals with frequencies in the range of said third, fourth, or fifth frequency band, respectively.

13. A multi-band frequency synthesizer according to claim 12, wherein the output frequency of the tunable voltage-controlled oscillator of said third frequency synthesizer subunit takes on values from a frequency interval ranging from 3,200 to 3,396 MHz.

14. A multi-band frequency synthesizer according to claim 8, further comprising a frequency mixer mixing the signal supplied by the second frequency synthesizer subunit with the down-scaled auxiliary signal to form a carrier signal in the range of said third frequency band or a precursor signal needed for deriving a signal ($c_{o4,i}(t)$) in the range of the fourth frequency band.

15. A multi-band frequency synthesizer according to claim 8, further comprising a frequency divider dividing the frequency of said signal by a further integer value to derive a signal in the range of the fourth frequency band from a signal supplied by the frequency mixer.

16. A multi-band frequency synthesizer according to claim 14, further comprising a first low-pass filter for eliminating spurious harmonics caused by the frequency mixer for generating signals with frequencies in the range of the third or the fourth frequency band, respectively.

17. A multi-band frequency synthesizer according to claim 15, further comprising a second low-pass filter for eliminating spurious harmonics caused by the second frequency divider providing said fourth carrier signal.

18. A multi-band frequency synthesizer according to claim 8 wherein:
the frequencies of the first frequency band take on values from frequency intervals ranging from 1,900 to 1,920 MHz, 2,010 to 2,025 MHz, and from 1,920 to 1,980 MHz, respectively,
the frequencies of the second frequency band take on values from the frequency interval ranging from 2,110 to 2,170 MHz,
the frequencies of the third frequency band take on values from frequency intervals ranging from 1,710 to 1,785 MHz, 1,805 to 1,880 MHz, 1,800 to 1,910 MHz, or 1,930 to 1,990 MHz, respectively,
the frequencies of the fourth frequency band take on values from frequency intervals ranging from 890 to 915 MHz, 935 to 960 MHz, or 869 to 894 MHz, respectively, and
the frequencies of the fifth frequency band take on values from the frequency interval ranging from 824 to 849 MHz.

19. A wireless multi-mode transceiver for generating tunable carrier signals whose frequencies are located in different frequency bands used for the uplink and downlink channels of a number of wireless telecommunication standards, respectively, which comprises a multi-band frequency synthesizer according to claim 8.

* * * * *

UNITED STATES PATENT AND TRADEMARK OFFICE
CERTIFICATE OF CORRECTION

PATENT NO.       : 7,792,510 B2
APPLICATION NO.  : 10/548552
DATED            : September 7, 2010
INVENTOR(S)      : Pestryakov et al.

It is certified that error appears in the above-identified patent and that said Letters Patent is hereby corrected as shown below:

Column 6, Line 25: Please correct "OF TEE DRAWINGS"
to read -- OF THE DRAWINGS --

Column 8, Line 43: Please correct "filtered (11a)" to read -- filtered (S11a) --

Column 9, Line 19: Please correct "$M_{12}$, which "to read -- $M_{11}$, which --

Column 10, Line 15: Please correct " ports ① to ② " to read -- ports ① to ⑤ --

Column 12, Line 42: Please correct "coefficient $N_{3j}$, the"
to read -- coefficient $N_{2j}$, the --
Line 44: Please correct "at port ② and " to read -- at port ④ and --

Signed and Sealed this
Fifteenth Day of February, 2011

David J. Kappos
*Director of the United States Patent and Trademark Office*